United States Patent
Yamamoto et al.

(10) Patent No.: US 8,737,781 B2
(45) Date of Patent: May 27, 2014

(54) OPTICAL WAVEGUIDE AND METHOD OF MANUFACTURING THE SAME, AND OPTICAL WAVEGUIDE DEVICE

(75) Inventors: Kazunao Yamamoto, Nagano (JP); Hideki Yonekura, Nagano (JP); Kenji Yanagisawa, Nagano (JP); Takanori Yamamoto, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 293 days.

(21) Appl. No.: 13/308,895

(22) Filed: Dec. 1, 2011

(65) Prior Publication Data

US 2012/0141063 A1   Jun. 7, 2012

(30) Foreign Application Priority Data

Dec. 3, 2010   (JP) ................. 2010-269941

(51) Int. Cl.
*G02B 6/26*   (2006.01)
*G02B 6/42*   (2006.01)
*G02B 6/10*   (2006.01)

(52) U.S. Cl.
USPC ............................. 385/39; 385/14; 385/131

(58) Field of Classification Search
USPC ................. 385/14, 31, 39, 129–132
See application file for complete search history.

(56) References Cited

U.S. PATENT DOCUMENTS

2011/0286692 A1*   11/2011   Yanagisawa .................. 385/14

FOREIGN PATENT DOCUMENTS

| JP | 2005-70141 A1 | 3/2005 |
|----|---------------|--------|
| JP | 4234061 B2 | 12/2008 |

* cited by examiner

*Primary Examiner* — Kevin S Wood
(74) *Attorney, Agent, or Firm* — Kratz, Quintos & Hanson, LLP

(57) ABSTRACT

A method of manufacturing an optical waveguide, includes preparing a light path conversion component including a structure in which a protruding portion having a light path conversion inclined surface is covered with a metal layer and the metal layer serves as a light path conversion mirror, and a structural body in which a core layer is formed on a first cladding layer and an opening portion is provided in an end side of a light path of the core layer, arranging the light path conversion mirror of the light path conversion component in the opening portion of the core layer, and forming a second cladding layer covering the core layer, wherein a light path of a light that propagates through the core layer is converted toward a first cladding layer side by the light path conversion mirror.

4 Claims, 9 Drawing Sheets (perspective view)

(perspective view)

(plan view)

(plan view)

(plan view)

OPTICAL WAVEGUIDE AND METHOD OF MANUFACTURING THE SAME, AND OPTICAL WAVEGUIDE DEVICE

CROSS-REFERENCE TO RELATED APPLICATIONS

This application is based upon and claims the benefit of priority of the prior Japanese Patent Application No. 2010-269941, filed on Dec. 3, 2010, the entire contents of which are incorporated herein by reference.

FIELD

It is related to an optical waveguide and a method of manufacturing the same and an optical waveguide device.

BACKGROUND

Recently, the development of the backbone network communication line as mainly focusing on the optical fiber communication technology is proceeding steadily and, in such a situation, the electronic wirings in the information terminal are becoming a bottleneck. Against such background, instead of the conventional electric circuit substrate in which all signal transmissions are made by using the electric signal, the optoelectronic composite substrate (optical waveguide device) of the type that transmits high-speed parts by the light has been proposed, in order to compensate the limit of transmission speed of the electric signal.

In the optoelectronic composite substrate, the light signal is transmitted by the optical waveguide including such a structure in which the core layer is surrounded by the cladding layers.

In an example of the optical waveguide manufacturing method, first the lower cladding layer, the core layers, and the upper cladding layer are formed sequentially on the substrate. Then, the resultant structure is processed so as to divide the core layer from the upper cladding layer side, and thus the groove portion having the inclined surface is formed. Then, the metal layer is partially formed on the groove portion by the mask vapor deposition, or the like, and thus the light path conversion mirror is obtained.

Then, a light which propagates through the core layer is made to reflect in the vertical direction by the metal layer (light path conversion mirror) on the inclined surface of the groove portion, thus the light path is converted.

A related art is disclosed in Japanese Laid-open Patent Publication No. 2005-70141 and Japanese Patent No. 4234061.

In the prior art, after the groove portion having the inclined surface is formed by processing the optical waveguide, the metal layer is partially formed on the groove portion only. Therefore, there exists such problems that it takes much time when forming the light path converting portion and thus a manufacturing efficiency is bad, and that an increase in cost is also brought about because the particular film forming equipment such as the mask vapor deposition, or the like is needed.

SUMMARY

According to one aspect discussed herein, there is provided a method of manufacturing an optical waveguide, which includes preparing a light path conversion component including a structure in which a protruding portion having a light path conversion inclined surface is covered with a metal layer and the metal layer on the light path conversion inclined surface serves as a light path conversion mirror, and a structural body in which a core layer is formed on a first cladding layer and an opening portion is provided in an end side of a light path of the core layer, arranging the light path conversion mirror in the opening portion of the core layer by fixing the protruding portion of the light path conversion component in the opening portion of the core layer to direct the light path conversion inclined surface of the light path conversion component toward a light path side, and forming a second cladding layer covering the first cladding layer and the core layer, wherein a light path of a light that propagates through the core layer is converted toward a first cladding layer side by the light path conversion mirror.

According to another aspect discussed herein, there is provided an optical waveguide, which includes a first cladding layer, a core layer formed on the first cladding layer and in which an opening portion is provided in an end side of a light path, a light path conversion component including a structure in which a protruding portion having a light path conversion inclined surface is covered with a metal layer and the metal layer on the light path conversion inclined surface serves as a light path conversion mirror, and which is fixed in the opening portion of the core layer to direct the light path conversion inclined surface toward a light path side, and a second cladding layer covering the first cladding layer and the core layer, wherein a light path of a light that propagates through the core layer is converted toward the first cladding layer side by the light path conversion mirror.

DESCRIPTION OF EMBODIMENT

An embodiment of the present invention will be explained with reference to the accompanying drawings hereinafter.
(Embodiment)
FIG. 1A to FIG. 7B are views depicting a method of manufacturing an optical waveguide according to an embodiment, and FIG. 8 is a sectional view depicting the optical waveguide according to the embodiment.

Figure 1A:
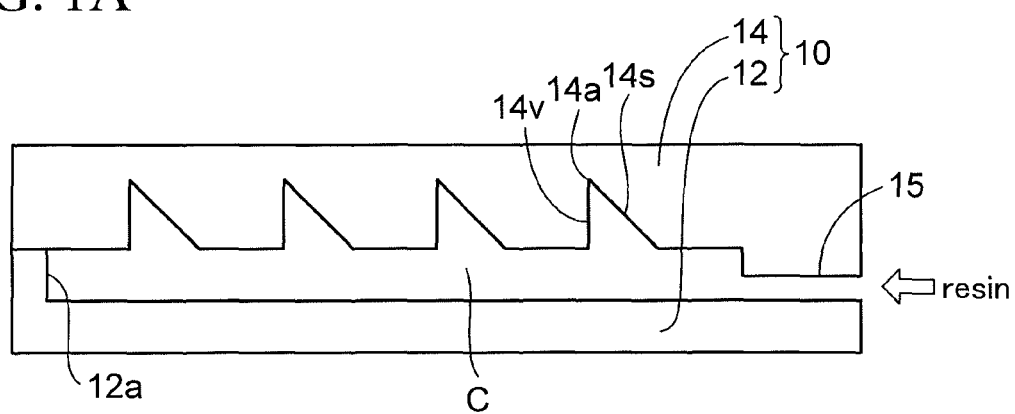
FIGS. 1A and 1B are sectional views (#1) depicting a method of manufacturing an optical waveguide according to an embodiment.

In the method of manufacturing the optical waveguide according to the present embodiment, as depicted in FIG. 1A, first, a mold 10 (die) for forming a resin cubic member is prepared. As described later, individual light path conversion components are obtained by cutting the resin cubic member.

The mold 10 includes a lower mold 12 and an upper mold 14. A concave portion 12a is provided on the upper surface side of the lower mold 12. Also, a plurality of grooves 14a are provided side by side on the lower surface side of the upper mold 14. The groove 14a of the upper mold 14 is formed with like an inverted V shape. This inverted V shape includes an inclined surface 14s for constituting a light path conversion inclined surface of the light path conversion component, and a sidewall surface 14v.

The grooves 14a of the upper mold 14 are provided to extend in the depth direction in FIG. 1A respectively. The inclined surfaces 14s of the grooves 14a are formed to incline at a predetermined angle (preferably, 45°) to the horizontal direction.

In FIG. 1A, the sidewall surface 14v of the groove 14a is formed as a perpendicular surface. In this case, this sidewall surface 14v may be formed to incline slightly.

By arranging the upper mold 14 on the lower mold 12, a cavity C (hollow) is provided between them, and also a resin supply portion 15 functioning as a resin supply port is provided between them.

Figure 1B:
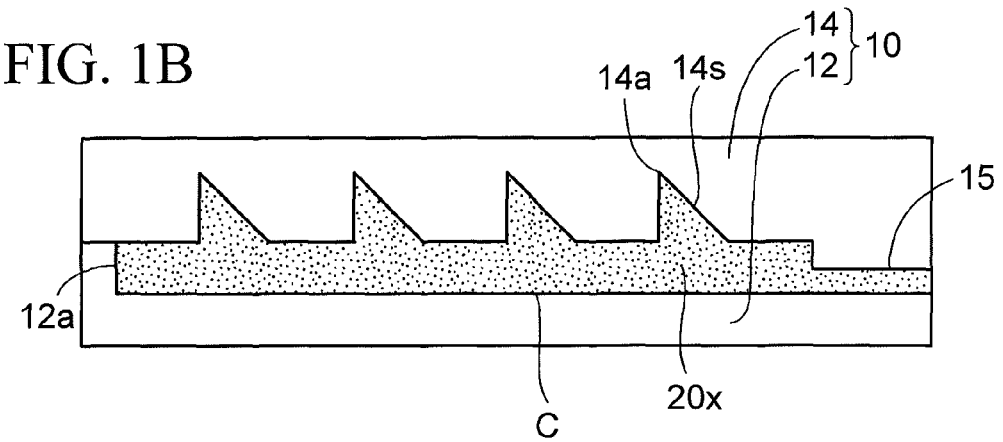

Then, as depicted in FIG. 1B, a melted resin 20x is poured into the cavity C side through the resin supply portion 15 of the mold 10. Thus, the resin 20x is filled into the whole of the cavity C and then is cured. As the resin 20x, a thermosetting epoxy resin or a thermosetting acrylic resin is used preferably. After this, the upper mold 14 and the lower mold 12 are removed, and the resin formed in resin supply portion 15 is broken off.

Figure 2:
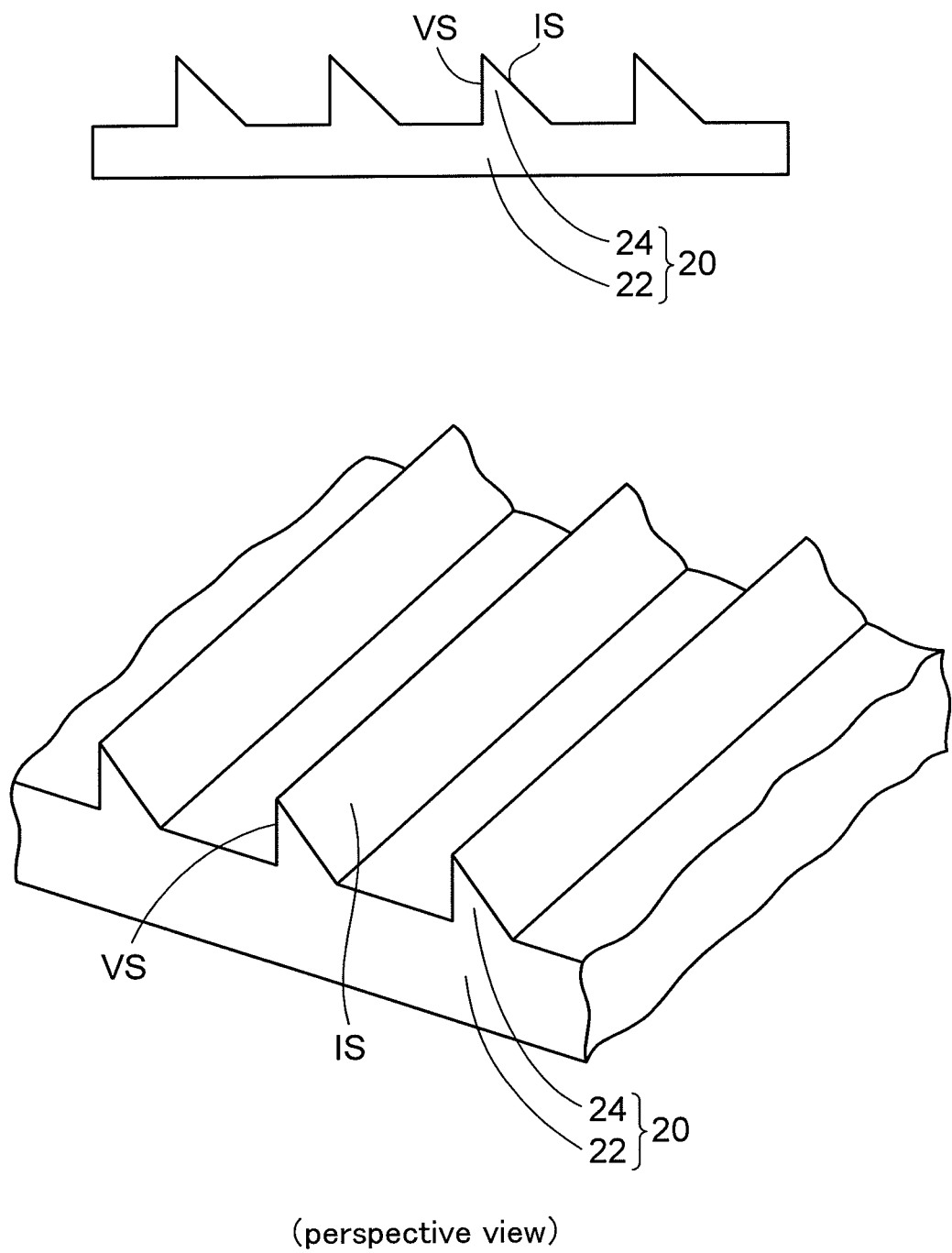
FIG. 2 is a sectional view and a perspective view (#2) depicting the method of manufacturing the optical waveguide according to the embodiment.

By this matter, as depicted in FIG. 2, a resin cubic member 20 whose profile responds to a shape of the cavity C of the mold 10 is obtained. By further reference to a perspective view of FIG. 1, the resin cubic member 20 includes a substrate 22, and a plurality of protruding portions 24 which are connected to the substrate 22 and protrude upward. Each protruding portion 24 is formed of a horizontal putting triangular post shape in which a light path conversion inclined surface IS and a sidewall surface VS intersect with each other to extend towards the inner side.

The light path conversion component is obtained from the part which includes each protruding portion 24 of the resin cubic member 20. By exchanging the mold 10, the resin cubic member 20 including the protruding portions 24, whose length and arrangement number are set arbitrarily according to the design of the optical waveguide, can be made.

Also, the resin cubic member 20, in which the protruding portion 24 is arranged to be divided only on the parts corresponding to opening portions 52a of core layers 52 described later, may be formed.

In FIGS. 1A and 1B and FIG. 2, the method of making the resin cubic member 20 by using the transfer molding method is illustrated. Here, the resin cubic member 20 may be made by arranging a resin film kept in a semi-cured state on a surface of on the groove 14a side of the upper mold 14, then pushing the resin film by the pressing member, and then curing this resin film. That is, the resin cubic member 20 including a plurality of protruding portions 24, as depicted in FIG. 2, may be made integrally molding the resin by means of various methods.

Also, if the material can be applied to the integral molding, the similar cubic member may be formed of any material other than the resin.

Figure 3A:
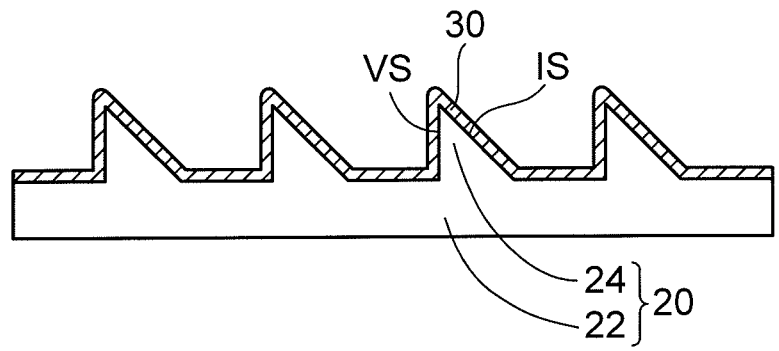
FIGS. 3A and 3B are sectional views and a perspective view (#3) depicting the method of manufacturing the optical waveguide according to the embodiment.

Then, as depicted in FIG. 3A, a metal layer 30 having a light reflective property is formed on the whole surface of on the protruding portion 24 side of the resin cubic member 20 in FIG. 2 by the sputter method or the vapor deposition method. As the metal layer 30 having a light reflective property, a gold (Au) layer, an aluminum (Al) layer, a silver (Ag) layer, or the like may be used, and its thickness may be set in a range from 0.2 μm to 0.5 μm.

Figure 3B:
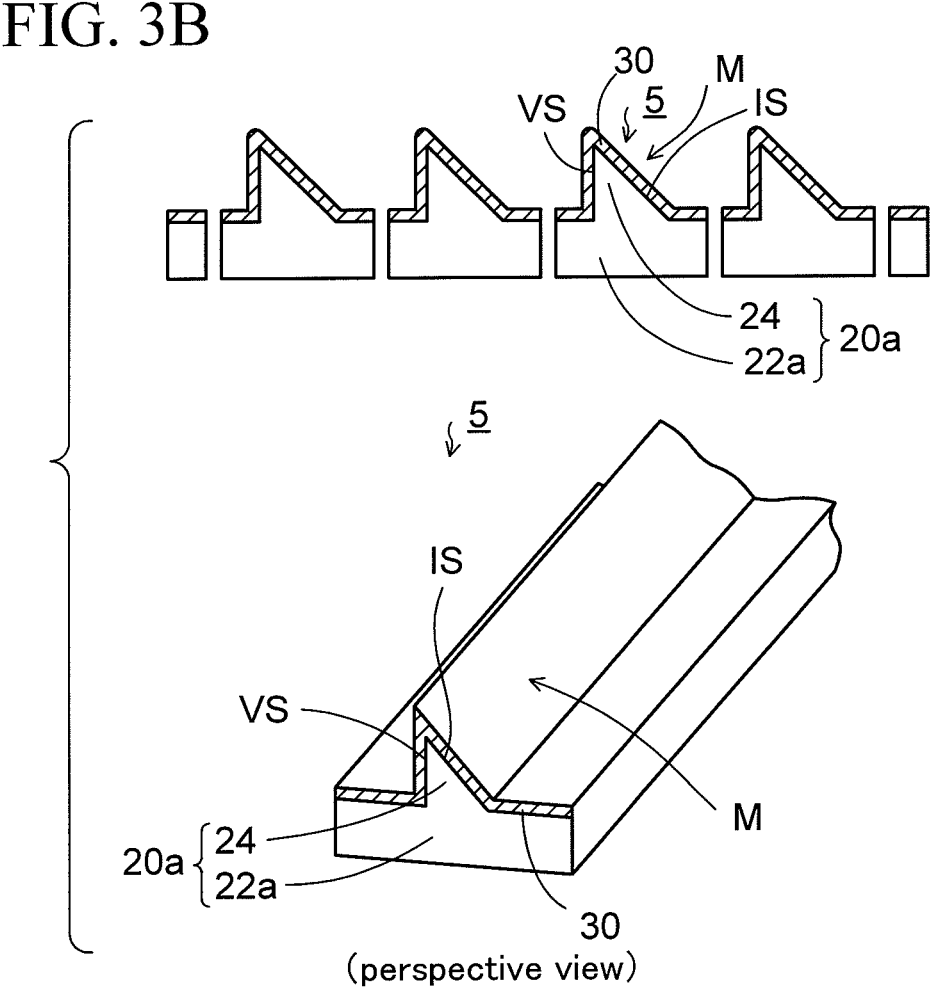

Then, as depicted in FIG. 3B, the resin cubic member 20 on which the metal layer 30 is formed, is divided by cutting from the metal layer 30 to the substrate 22 of the resin cubic member 20 along respective areas between the protruding portions 24 by a router, a dicing saw, or the like. Thus, individual light path conversion components 5 are obtained.

As depicted in a perspective view of FIG. 3B, the light path conversion component 5 includes a resin cubic portion 20a that is integrally molded, and the metal layer 30 covering a surface of the protruding portion 24 side of the resin cubic portion 20a. This resin cubic portion 20a includes a substrate portion 22a extended along one direction, and the protruding portion 24 extended in the longer direction in a center part of the substrate portion 22a to protrude upward.

The protruding portion 24 of the light path conversion component 5 includes the light path conversion inclined surface IS and the sidewall surface VS. The metal layer 30 formed on the light path conversion inclined surface IS functions as a light path conversion mirror M.

The light path conversion inclined surface IS of the light path conversion component 5 is formed to incline at a predetermined angle (preferably, 45°) to the horizontal, direction. Also, the sidewall surface VS of the light path conversion component 5 is formed as the perpendicular surface, but this sidewall surface VS may be formed to incline slightly.

In the light path conversion component 5 of the present embodiment, since the outer surface side of the metal layer 30 serves as the light path conversion mirror M, the inside of the resin cubic portion 20a (the substrate portion 22a and the protruding portion 24) does not serve as the light path. Accordingly, in the resin cubic portion 20a (the substrate portion 22a and the protruding portion 24), there is no need to consider the optical characteristics that the transparent resin which is identical resin with the core layer 52 and first and second cladding layers 50, 54, or the like is used, or the like. Therefore various resin materials such as an opaque resin, and the like can be used as the resin cubic portion 20a.

As a result, the resin used for the resin cubic portion 20a is not restricted to an expensive resin material, and hence the light path conversion component 5 can be made at a low cost.

The protruding portion 24 of the light path conversion component 5 may includes the predetermined light path conversion inclined surface IS on its outer surface. In addition to the horizontal putting triangular post shape as depicted in FIG. 3B, any cubic shape such as a horizontal putting trapezoidal post, or the like may be employed as the shape of the protruding portion 24.

Figure 4:
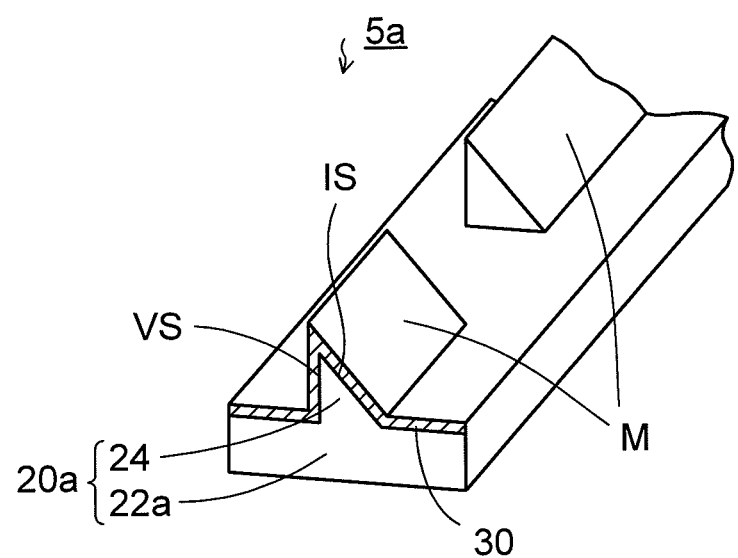
FIG. 4 is a perspective view depicting another light path conversion component used in the method of manufacturing the optical waveguide according to the embodiment.

Also, as depicted in FIG. 4, as described above, in the case that the resin cubic member 20 including the protruding portion 24 only in the parts corresponding to the opening portions 52a of the core layers 52 described later should be made in the step in FIG. 2, a light path conversion component 5a which has such a structure that the protruding portion 24 is formed to be divided in the longer direction on the substrate portion 22a, and the surface of the protruding portion 24 side is covered with the metal layer 30, is obtained.

Next, a method of mounting the above-mentioned light path conversion component 5 on the optical waveguide will be explained hereunder.

Figure 5A:
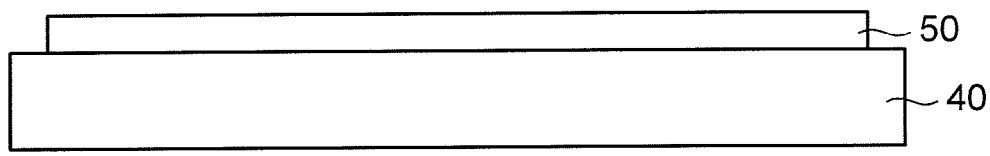
FIGS. 5A and 5B are sectional views and a plan view (#4) depicting the method of manufacturing the optical waveguide according to the embodiment.

As depicted in FIG. 5A, first, a substrate 40 is prepared. The substrate 40 is prepared as a temporary substrate which is finally removed, and is formed of a polycarbonate resin, or the like that can be peeled off and removed. Then, a photosensitive resin layer (not shown) for obtaining the first cladding layer 50 is formed on the substrate 40, and then is exposed/developed based on the photolithography. Then, the photosensitive resin layer is cured by applying the heating process at about 100° C.

By this matter, the first cladding layer 50 is formed as an integrated pattern in an optical waveguide forming area on the substrate 40. A thickness of the first cladding layer 50 is set in a range from about 10 μm to 20 μm.

As the photosensitive resin layer for obtaining the first cladding layer 50, there are a photosensitive epoxy resin, and the like. As the method of forming the photosensitive resin layer, a photosensitive resin sheet kept in a semi-cured state (B-stage) may be pasted, or a liquid photosensitive resin may be coated.

In the step of forming the core layer and the second cladding layer described later, the similar resin is preferably used.

Figure 5B:
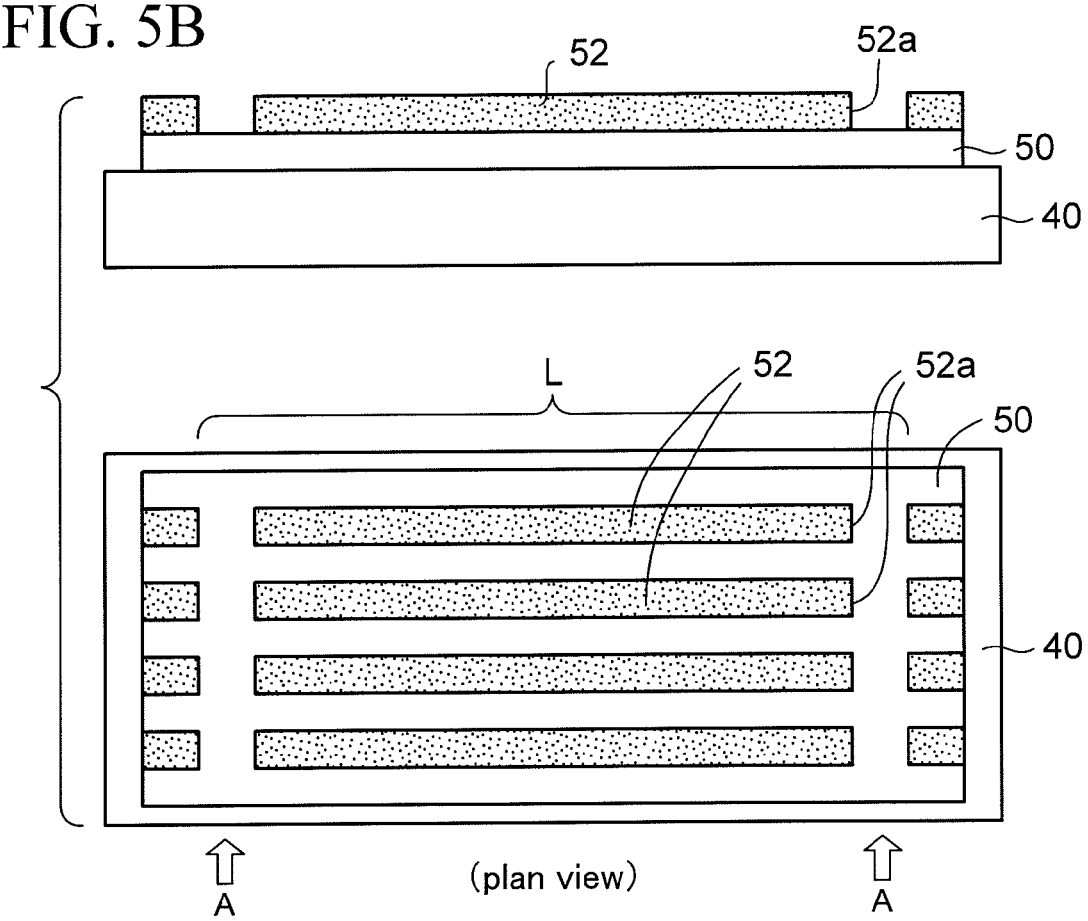

Then, as depicted in FIG. 5B, a photosensitive resin layer (not shown) for obtaining the core layer is formed on the first cladding layer 50. Then, the photosensitive resin layer is exposed/developed based on the photolithography, and then is cured by applying the heating process at about 100° C. Thus, the core layers 52 are obtained.

As depicted in a plan view of FIG. 5B, the core layers 52 like belt shape each extending in the lateral direction are arranged side by side in the longitudinal direction on the first cladding layer 50. A refractive index of the core layers 52 is set higher than those of the first cladding layer 50 and the second cladding layer descried later. A thickness of the core layers 52 is set in arrange from about 30 μm to 80 μm, and an arrangement pitch of the core layers 52 is set to about 250 μm.

Then, respective core layers 52 are formed in such a structure that the opening portion 52a (non-forming portion) is arranged on the light path converting portions, on which the light path conversion component 5 is mounted respectively. In the plan view of FIG. 5B, an example in which one light path L is provided in each core layer 52 is illustrated. Also, the opening portions 52a of each core layer 52 are arranged on one end side and the other end side of the light path L such that these opening portions 52a are aligned in the belt-like areas A, which intersect orthogonally with the core layers 52, respectively.

In this manner, the light path conversion components 5 described above, and the structural body in which a plurality of core layers 52 are formed side by side on the first cladding layer 50 and the opening portions 52a are provided to the end sides of the light paths L of a plurality of core layers 52 respectively so as to align in the belt-like areas A, are prepared.

Figure 6:
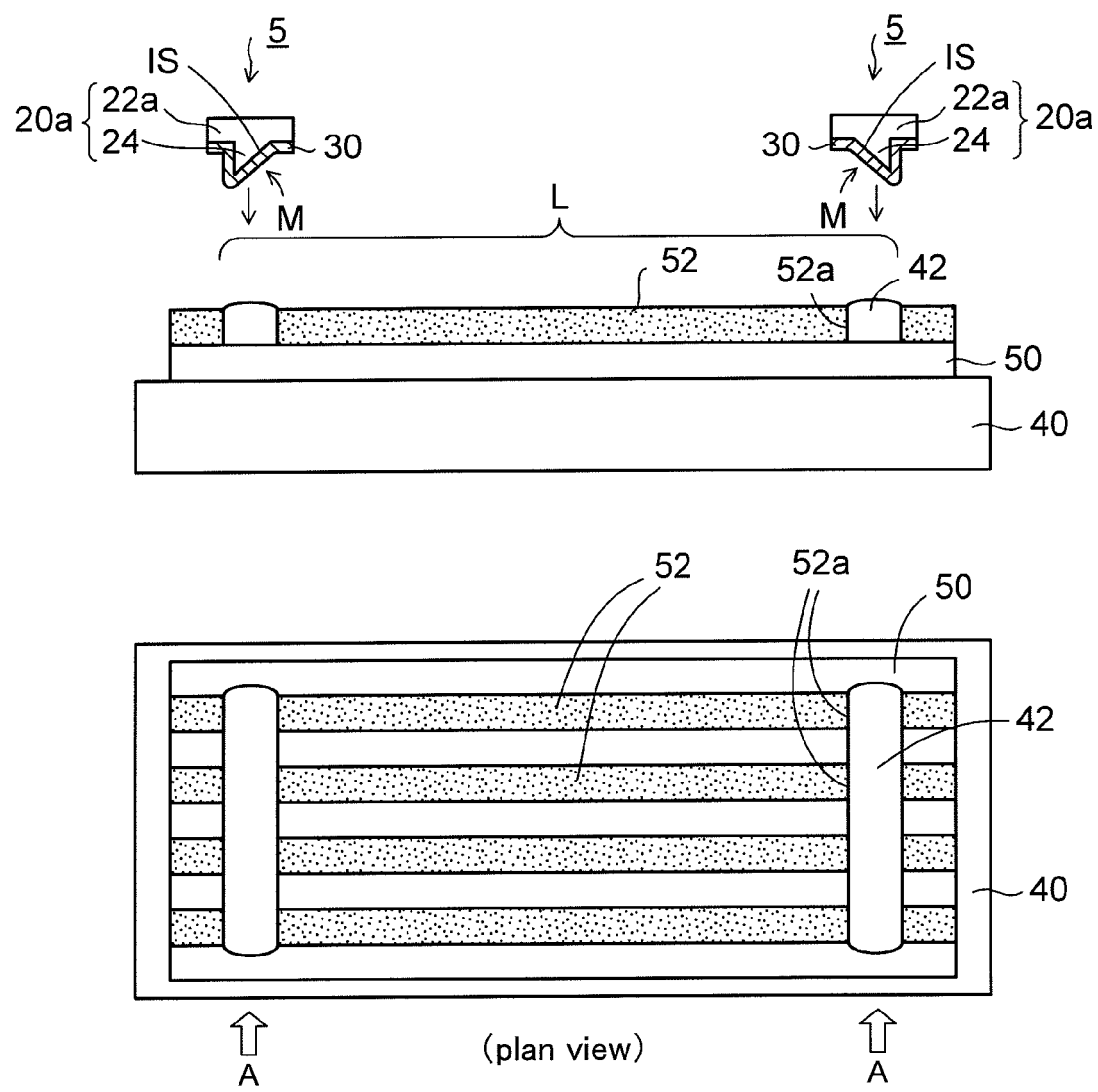
FIG. 6 is a sectional view and a plan view (#5) depicting the method of manufacturing the optical waveguide according to the embodiment.

Then, as depicted in FIG. 6, an adhesive agent 42 is coated onto the opening portions 52a of respective core layers 52. In a plan view of FIG. 6, the adhesive agent 42 is coated onto the whole of the belt-like areas A in which the opening portions 52a of respective core layers 52 are aligned. In this case, the adhesive agent 42 may be coated partially only onto the opening portions 52a of respective core layers 52.

Since the adhesive agent 42 contacts the light path conversion mirror M of the light path conversion component 5 and serves as the light path conversion path, such adhesive agent 42 is formed of the identical resin with the above first cladding layer 50. Otherwise, the adhesive agent 42 may have the equal refractive index of light to that of the first cladding layer 50, in this case, the adhesive agent 42 may be formed of the resin different from the first cladding layer 50.

Then, as depicted in a sectional view of FIG. 6, while directing the protruding portion 24 of the light path conversion component 5 downward and also directing the light path conversion inclined surface IS of the protruding portion 24 toward the light path L side, the protruding portion 24 of the light path conversion component 5 is pushed into the adhesive agent 42 formed in both belt-like areas A that the opening portions 52a of the core layers 52 are aligned. Then, the adhesive agent 42 is cured by applying the heating process.

Figure 7A:
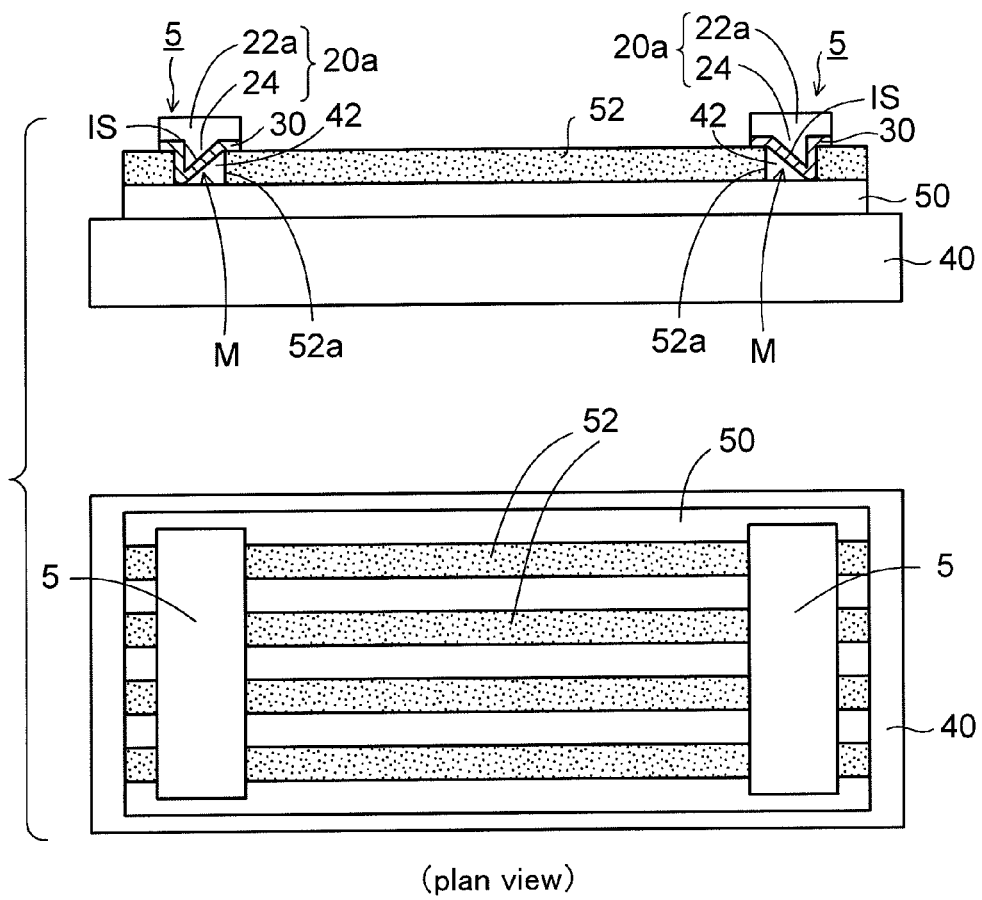
FIGS. 7A and 7B are sectional views and a plan view (#6) depicting the method of manufacturing the optical waveguide according to the embodiment.
Figure 8:
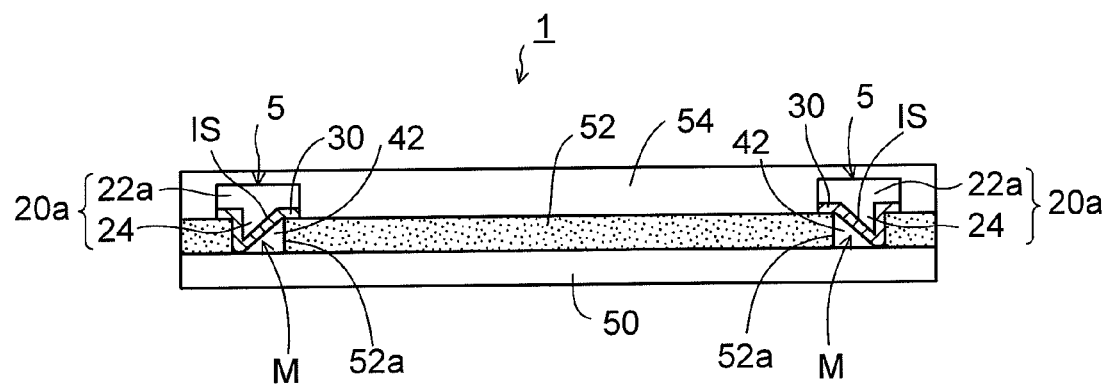
FIG. 8 is a sectional view depicting the optical waveguide according to the embodiment.

By this matter, as depicted in FIG. 7A, the light path conversion component 5 is fixed to respective opening portions 52a of a plurality of core layers 52 with the adhesive agent 42. At this time, the metal layer 30 formed on the substrate portion 22a of the resin cubic portion 20a of the light path conversion component 5 is arranged to contact the upper surfaces of the core layers 52.

Also, the sidewall surface VS of the protruding portion 24 of the light path conversion component 5 is arranged to contact the sidewalls of the opening portions 52a of the core layers 52. In this way, the substrate portion 22a of the light path conversion component 5 is arranged in parallel with the core layers 52.

By this matter, the light path conversion inclined surface IS of the light path conversion component 5 is arranged such that it is inclined to intersect at a predetermined angle (preferably, 45°) to the extending direction (the light propagation direction) of the core layers 52, thereby the metal layer 30 of the light path conversion inclined surface IS serves as the light path conversion mirror M.

In this manner, in the present embodiment, upon making the light path converting portion, such an approach is employed that the light path conversion component 5 is made in advance, and then this light path conversion component 5 is mounted on the opening portions 52a of the core layers 52. As a result, in contrast to the prior art in which the inclined surfaces are made by applying the cutting process to the optical waveguide and then the light path converting portions are formed by forming partially the metal layer, the step of forming the light path converting portion can be simplified and also a takt time and a production cost can be reduced remarkably.

In the prior art, the optical waveguide substrate whose area is relatively large is set up in the batch type chamber of the vapor deposition equipment. Therefore, the number of samples that can be treated with one batch is small. As a result, production efficiency is bad and also an increase in cost is brought about. In addition, it is necessary to set up a mask, and therefore the process becomes complicated.

However, in the present embodiment, it is not needed that the metal layer should be formed partially on the optical waveguide by the vapor deposition equipment, or the like. Upon making the light path conversion component 5, the metal layer 30 may be formed on the resin cubic member 20 merely by the maskless step. Therefore, the light path conversion component 5 can be formed simultaneously with the making of the optical waveguide. As a result, production efficiency can be improved, and thus a reduction in cost can be achieved.

In addition, as described above, the light path conversion component 5 of the present embodiment is formed based on the resin integral molding. Therefore, the light path conversion inclined surface IS having high smoothness can be obtained. As a result, the light reflection characteristics of the light path conversion mirror M (the metal layer 30) can be improved.

Otherwise, as described above, in the case that the light path conversion component 5*a* (FIG. 4) in which the protruding portion 24 is arranged to be divided only on the parts corresponding to the opening portions 52*a* of the core layers 52 is used, the protruding portion 24 of the light path conversion component 5*a* is arranged only on the opening portions 52*a* of the core layers 52 respectively and functions as the light path conversion mirror M.

In this case, the light path conversion mirror M is not arranged in the areas located between the core layers 52. Therefore, particularly in the case that the core layers 52 are arranged at a narrow pitch, such a structure can be provided that interference of light is difficult to occur in the areas between the core layers 52.

Figure 7B:
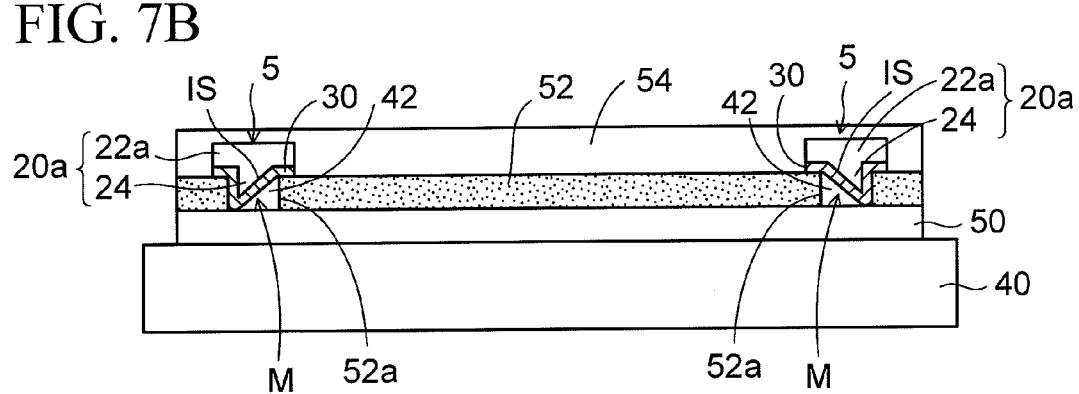

Then, as depicted in FIG. 7B, a photosensitive resin layer (not shown) for obtaining the second cladding layer is formed on the first cladding layer 50 and the core layers 52, and then is exposed/developed based on the photolithography. Then, the photosensitive resin layer is cured by applying the heating process at about 100° C.

By this mater, the second cladding layer 54 covering the first cladding layer 50 and the core layers 52 is formed in the optical waveguide forming area on the substrate 40 as an integrated pattern.

With the above, a structural body in which the core layers 52 are surrounded by the first cladding layer 50 and the second cladding layer 54 can be obtained.

Then, as depicted in FIG. 8, the lower surface of the first cladding layer 50 is exposed by removing the substrate 40 from the structural body in FIG. 7B. The substrate 40 is formed of a polycarbonate resin, or the like, and can be easily removed by peeling off along the boundary to the first cladding layer 50.

With the above, an optical waveguide 1 of the present embodiment is obtained.

As explained above, in the method of manufacturing the optical waveguide of the present embodiment, the light path conversion component 5 and the optical waveguide 1 are made separately, and then they are combined, thereby the light path conversion mirror M can be obtained. Therefore, in comparison with the prior art, the steps of forming the light path converting portion can be simplified remarkably, and thus a reduction in cost can be achieved.

As depicted in FIG. 8, in the optical waveguide 1 of the present embodiment, the belt-like core layers 52 each extending in the lateral direction are arranged side by side in the longitudinal direction on the first cladding layer 50 (a plan view of FIG. 7A).

Then, the opening portion 52*a* is formed on the core layers 52 on both end sides of the light paths L respectively. The opening portions 52*a* of the core layers 52 are arranged side by side in the belt-like areas A which intersect orthogonally with a plurality of core layers 52 (a plan view of FIG. 5B).

The protruding portion 24 of the light path conversion component 5 described above is adhered onto the opening portions 52*a* of the core layers 52 with the adhesive agent 42. The light path conversion component 5 is arranged such that the light path conversion inclined surface IS of the protruding portion 24 is directed toward the optical path L side.

The metal layer 30, which is formed on the light path conversion inclined surface IS of the protruding portion 24 of the light path conversion component 5, functions as the light path conversion mirror M.

In the case that the light path conversion component 5*a* in FIG. 4 described above is used, the protruding portion 24 of the light path conversion component 5 is arranged only on the opening portions 52*a* of the core layers 52 respectively, and it serves as the light path conversion mirror M.

Further, the second cladding layer 54 covering the first cladding layer 50, the core layers 52, and the light path conversion components 5 is formed. In this manner, the optical waveguide 1 has such a structure that the core layers 52 are surrounded by the first cladding layer 50 and the second cladding layer 54.

Then, the light path that the light propagates through the core layer 52 can be converted by 90° toward the first cladding layer 50 side by the light path conversion mirror M (the metal layer 30) of the light path conversion inclined surface IS of the light path conversion components 5.

Since the optical waveguide 1 of the embodiment is manufactured by the above manufacturing method, a structure of the light path converting portion can be made simple and also a reduction in cost can be attained. Also, since the light path conversion component 5 is formed by the resin cubic member 20 which is obtained by integrally molding the resin, the light path conversion inclined surface IS whose smoothness is high can be obtained and thus the light reflecting characteristic of the light path conversion mirror M can be improved.

Figure 9:
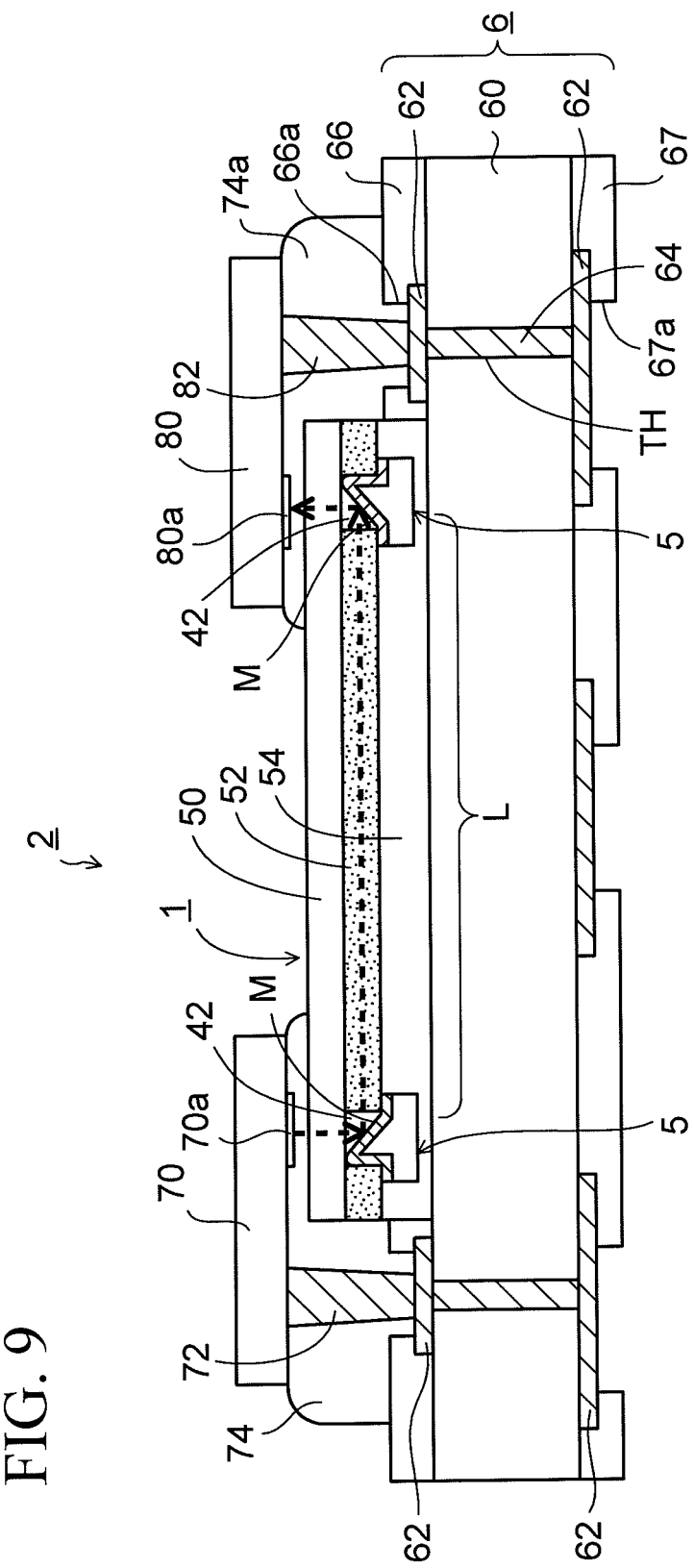
FIG. 9 is a sectional view depicting an optical waveguide device using the optical waveguide in FIG. 8.

Next, an optical waveguide device using the optical waveguide 1 in FIG. 8 will be explained hereunder. As depicted in FIG. 9, in an optical waveguide device 2 of the present embodiment, the optical waveguide 1 in FIG. 8 is arranged on the center main part on a wiring substrate 6 in a state that the top and bottom reverse.

In the optical waveguide 1 in FIG. 8 described above, the second cladding layer 54 is cured. In this case, before the second cladding layer 54 is cured, a surface of the second cladding layer 54 (resin film) side of the optical waveguide 1 is arranged on the wiring substrate 6, then the second cladding layer 54 is cured by the heat treatment, thereby the optical waveguide 1 can be adhered onto the wiring substrate 6. That is, the second cladding layer 54 of the optical waveguide 1 also function as the adhesive agent because this second cladding layer 54 is formed of a thermosetting epoxy resin, or the like.

Alternatively, in FIG. 8 described above, a structural body in which the second cladding layer 54 is omitted is made, and then an adhesive resin layer functioning as the second cladding layer 54 is formed on the wiring substrate 6. Then, a surface of the core layers 52 side of the structural body in which the second cladding layer 54 is omitted, is arranged on the adhesive resin layer, and then the second cladding layer 54 may be obtained by curing the adhesive resin layer. In this case, like the structure in FIG. 9, the second cladding layer 54 of the optical waveguide 1 functions as the adhesive agent, and the optical waveguide 1 is adhered onto the wiring substrate 6.

Otherwise, as FIG. 8 described above, after the optical waveguide 1 is obtained by curing the second cladding layer 54, a surface of the second cladding layer 54 side of the optical waveguide 1 may be fixed onto the wiring substrate 6 by another adhesive agent.

In the wiring substrate 6, a wiring layer 62 serving as the electric wiring is formed on both surface sides of an insulating substrate 60 made of a glass epoxy resin, or the like respectively. Also, through holes TH are provided in the insulating substrate 60, and a penetration electrode 64 is filled in the through holes TH respectively. The wiring layers 62 on both surface sides are connected mutually via the penetration electrode 64.

Further, a solder resist 66 is formed like a frame on the peripheral part of the upper surface side of the insulating substrate 60, and an opening portion 66*a* of the solder resist 66 is provided on the connection parts of the wiring layers 62 respectively. Also, a solder resist 67 in which opening portions 67a are provided on the connection parts of the wiring layers 62, is formed on the lower surface side of the insulating substrate 60.

The connection parts of the wiring layers on the lower surface side of the insulating substrate 60 may serves as the external connection lands, otherwise the external connection terminals each protruding toward the outside may be provided by mounting a solder ball on the connection parts of the wiring layers 62, or the like.

Then, a light emitting element 70 is connected to the connection parts of the wiring layers 62 on the upper surface side of the wiring substrate 6 via bump electrodes 72 (gold bumps, or the like) and is mounted thereon such that this light emitting element 70 is optically coupled to the light path conversion mirror M on one end side (left side) of the light path L of the optical waveguide 1.

The light emitting element 70 is mounted in such a state that its emitting surface 70a is directed downward. As the light emitting element 70, the surface emitting laser (VCSEL: Vertical Cavity Surface Emitting Laser) is used preferably.

An underfill resin 74 is filled in a clearance located under the light emitting element 70. Since the underfill resin 74 constitutes the light path, this underfill resin is formed of the identical resin with the first and second cladding layers 50, 54. Alternately, the underfill resin 74 may be formed of a resin different from the first and second cladding layers 50, 54 if such resin has the equal refractive index of light to those of the first and second cladding layers 50, 54.

Also, a light receiving element 80 is connected to the connection parts of the wiring layers 62 on the upper surface side of the wiring substrate 6 via bump electrodes 82 (gold bumps, or the like) and is mounted thereon such that this light receiving element 80 is optically coupled to the light path conversion mirror M on the other end side (right side) of the light path L of the optical waveguide 1. The light receiving element 80 is mounted in such a state that its light receiving surface 80a is directed downward.

As the light receiving element 80, a photodiode is used preferably. An underfill resin 74a is filled in a clearance located under the light receiving element 80. Also, since the underfill resin 74a located under the light receiving element 80 constitutes the light path, this resin is formed of either the identical resin with the first and second cladding layers 50, 54, or the resin whose refractive index of light is equal to those of the first and second cladding layers 50, 54.

In the optical waveguide device 2 of the present embodiment, an electric signal which is output from a first LSI chip (CPU, or the like) (not shown) is supplied to the light emitting element 70, and a light is emitted downward from the emitting surface 70a of the light emitting element 70.

The light which is emitted from the light emitting element 70 is transmitted through the underfill resin 74, the first cladding layer 50, and the adhesive agent 42, and then arrives at the light path conversion mirror M of the light path conversion component 5. Then, the light is reflected by the light path conversion mirror M positioned on the one end side, then the light path is converted by 90°, and then the light is entered in the core layer 52.

Then, the light which is entered in the core layer 52 propagates through the core layer 52 while repeating a total reflection, and arrives at the light path conversion mirror M of the light path conversion component 5 positioned on the other end side. Then, the light is reflected by the light path conversion mirror M on the other end side, then the light path is converted by 90°, and then the light is transmitted through the adhesive agent 42, the first cladding layer 50, and the underfill resin 74a, and is entered in the light receiving surface 80a of the light receiving element 80.

The light receiving element 80 converts the light signal into the electric signal, and the electric signal is supplied to a second LSI chip (memory, or the like) (not shown).

The optical waveguide device 2 of the present embodiment includes the optical waveguide 1 having the desired characteristics and the light path conversion mirror M whose surface is smooth. As a result, the light emitting element 70 and the light receiving element 80 can be optically coupled to the optical waveguide 1 with good reliability. Also, the light path converting portions of the optical waveguide 1 can be formed by a simple method, and therefore the optical waveguide device 2 can be manufactured at a low cost.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and interiority of the invention. Although the embodiments of the present invention have been described in detail, it should be understood that the various changes, substitutions, and alterations could be made hereto without departing from the spirit and scope of the invention.

What is claimed is:

1. An optical waveguide, comprising:
   a first cladding layer;
   a core layer formed on the first cladding layer and in which an opening portion is provided in an end side of a light path;
   a light path conversion component including a resin cubic member formed of an opaque resin, including
      a substrate portion, and
      a protruding portion provided on a center part of the substrate portion, and the protruding portion formed of a horizontal putting triangular post shape having a light path conversion inclined surface and a vertical sidewall surface which intersects with the light path conversion inclined surface; and
   a metal layer serving as a light path conversion mirror, and covering the light path conversion inclined surface and the sidewall surface of the protruding portion and a surface of the substrate portion,
   wherein the metal layer formed on the surface of the substrate portion of the light path conversion component contacts an upper face of the core layer, and the metal layer formed on the sidewall surface of the protruding portion of the light path conversion component contacts a side wall of the opening portion of the core layer; and
   a second cladding layer covering the first cladding layer, the core layer and the substrate portion of the light path conversion component,
   wherein a light path of a light that propagates through the core layer is converted toward the first cladding layer side by the light path conversion mirror.

2. An optical waveguide according to claim 1, wherein the protruding portion of the light path conversion component is adhered in the opening portion of the core layer by an adhesive agent which is formed of either an identical resin with the first cladding layer or a resin whose refractive index is equal to a refractive index of the first cladding layer.

3. An optical waveguide device, comprising:
   the optical waveguide set forth in claim 1;

a wiring substrate arranged on the second cladding layer side of the optical waveguide;

a light emitting element mounted to the optical waveguide installment surface side of the wiring substrate and optically coupled to the light path conversion mirror provided on one end side of the optical waveguide; and a light receiving element mounted to the optical waveguide installment surface side of the wiring substrate and optically coupled to the light path conversion mirror provided on other end side of the optical waveguide.

4. An optical waveguide device according to claim 3, wherein the second cladding layer of the optical waveguide functions as an adhesive agent, and the optical waveguide is adhered to the wiring substrate by the second cladding layer.

* * * * *